United States Patent [19]
Gulick, Jr. et al.

[11] Patent Number: 5,760,882
[45] Date of Patent: Jun. 2, 1998

[54] CONTACT PRINTER AND METHOD OF MAKING A FILTER FOR A CONTACT PRINTER

[75] Inventors: Stephen Gulick, Jr.; Frederick Conrad Enrich, both of Rochester; Roger Roy Adams Morton, Penfiled, all of N.Y.

[73] Assignee: Eastman Kodak Company, Rochester, N.Y.

[21] Appl. No.: 667,258

[22] Filed: Jun. 20, 1996

[51] Int. Cl.⁶ ............................................. G03B 27/72
[52] U.S. Cl. .................. 355/80; 355/125; 355/132; 359/888; 430/7
[58] Field of Search ................... 355/6–7, 71, 74, 355/80, 125, 126, 132, 83, 113, 121; 359/888, 892; 430/5, 7, 309, 311; 358/302, 487, 506, 527

[56] References Cited

U.S. PATENT DOCUMENTS

| | | | |
|---|---|---|---|
| 2,155,149 | 4/1939 | Rutherford | 355/125 |
| 2,224,839 | 12/1940 | Steiner | 355/126 |
| 2,420,141 | 5/1947 | Lessler | 355/80 |
| 3,312,143 | 4/1967 | Karow et al. | 359/888 |
| 4,059,481 | 11/1977 | Nagano | 156/660 |
| 4,298,275 | 11/1981 | Critchlow et al. | 355/71 |
| 4,394,089 | 7/1983 | McIntosh et al. | 355/88 |
| 4,472,047 | 9/1984 | Stoudt | 355/4 |
| 4,575,222 | 3/1986 | Ahern et al. | 355/4 |

*Primary Examiner*—A. A. Mathews
*Attorney, Agent, or Firm*—Gordon M. Stewart

[57] ABSTRACT

A method of improving uneven illumination in a contact printer having an original image position and a light source to illuminate the original image position, which light source may illuminate the original image position non-uniformly, the method comprising: first forming a mask by exposing a photographic element to the light source and processing the element to form a negative image of the light source at a filtering position between the light source and the original image position; and positioning the mask at the filtering position. A second aspect of the method uses an electronic processor and gathered illumination data, to generate a mask.

31 Claims, 3 Drawing Sheets

5,760,882

1

CONTACT PRINTER AND METHOD OF MAKING A FILTER FOR A CONTACT PRINTER

FIELD OF THE INVENTION

The invention relates generally to the field of printing images, particularly integral images, using photographic printing, and particularly using contact printing.

BACKGROUND OF THE INVENTION

It is well known to copy an original image using a photographic printing technique in which a photosensitive element is exposed to light from the original image. In contact printing an original image is printed by positioning a light sensitive element in contact with an original transparency carrying the image, so that light from a light source passes through the original image onto the light sensitive element. Since no lens systems are required and the original image is adjacent the light sensitive element, the print exhibits very low degradation from the original image.

Contact printing then, is particularly desirable in cases where it is necessary to maintain a very high resolution in the print. There are many uses of contact printing in the areas of high quality film and lithographic reproduction for images, circuit boards and integrated cicuits. Another example is in the printing of integral images. Failure to maintain a high resolution may cause individual image segments or line segments, to overlap in the print leading to an undesirable image.

Integral image elements themselves are well known. For example, known integral image elements include those which use a lenticular lens sheet, fly's eye lens sheet, or barrier strip sheet and a three-dimensional integral image aligned with the sheet, so that a user can view the three-dimensional image without any special glasses or other equipment. Such imaging elements and their construction, are described in "Three-Dimensional Imaging Techniques" by Takanori Okoshi, Academic Press, Inc., New York, 1976. Integral image elements having a lenticular lens sheet (that is, a sheet with a plurality of adjacent, parallel, elongated, and partially cylindrical lenses) are also described in the following Unites States patents: U.S. Pat. No. 5,391,254; U.S. Pat. No. 5,424,533; U.S Pat. No. 5,241,608; U.S. Pat. No. 5,455,689; U.S. Pat. No. 5,276,478; U.S. Pat. No. 5,391,254; U.S. Pat. No. 5,424,533 and others; as well as allowed U.S. patent application Ser. No. 07/931,744. Integral image elements with lenticular lens sheets use what is referenced as a lenticular image having interlaced vertical image slices which. In the case of a three-dimensional lenticular image, these image slices are aligned with the lenticules so that a three-dimensional image is viewable when the lenticules are vertically oriented with respect to a viewer's eyes. The image may be conveniently laminated (that is, adhered) to an integral or lenticular lens sheet. Similar integral image elements, such as described in U.S. Pat. No. 3,268,238 and U.S. Pat. No. 3,538,632, can be used to convey a number of individual two-dimensional scenes (such as unrelated scenes or a sequence of scenes depicting motion) rather than one or more three-dimensional images. Integral image elements using reflective layers behind the integral image to enhance viewing of the integral image by reflected light, are also described in U.S. Pat. No. 3,751,258, U.S. Pat. No. 2,500,511, U.S. Pat. No. 2,039,648, U.S. Pat. No. 1,918,705 and GB 492,186.

While contact printing an original image, such as an original image, does not produce a print with as much degradation than might occur using an enlarger for printing, for example, it is not perfect. It is known that the light source used to illuminate the original image will not illuminate the original image completely uniformly. Typically, with a projection type light source, this means that the center of the print will tend to be darker (where the print is a negative). In an attempt to correct for this, a sequence of discrete filters has been used between the light source and original image, such that overall the sequence exhibits incremental decreases in density moving from the center to the periphery. However, this technique requires manually estimating the light intensity variance at the original image position, estimating a suitable filter sequence and then constructing it. Inherent errors in these steps will inevitably lead to poor correction for light intensity variance. Additionally, at the edges of the overlapping filters there will be a sudden drop in overall density and hence a sudden drop in light intensity.

It would be desirable then, to provide a means for improving illumination uniformity at the original image position in a contact printer, which is simple to implement and which does not produce at the original image position, edges across which there is a sudden variation in light intensity.

SUMMARY OF THE INVENTION

The present invention therefore provides a method of improving uneven illumination in a contact printer having an original image position and a light source to illuminate the original image position, which method comprises in one aspect:

first forming a mask by exposing a photographic element to the light source and processing the element to form a negative image of the light source at a filtering position between the light source and the original image position; and positioning the mask at the filtering position.

In a second aspect the method of the present invention comprises:

inputting into a computer, data representative of illumination at multiple laterally spaced locations positioned in a direction from the light source to the original image position;

processing the data in the computer to form a mask image which when printed on a support and placed at a filtering position between the light source and the original image position, improves illumination uniformity at the original image position;

printing the mask image on the support; and positioning the mask at the filtering position.

The present invention further provides a contact printer using a mask formed by either aspect of the method of the present invention. Additionally, the present invention provides a computer readable storage medium carrying program means. The program means includes any suitable computer readable program code which can be used by a computer to execute each of the calculation steps of the present invention.

The present invention then, provides in any aspect, a simple technique of improving upon illumination uniformity in a contact printer. In the case of the first aspect, upon exposure and processing, the mask automatically has higher densities at the locations where the most filtering is needed, and has no edges across which abrupt changes in optical density occur (unless they correspond to edges on the original image position across which corresponding abrupt changes in light intensity occur). In the case of the second aspect, use of the computer allows ready manipulation of the illumination data to generate the mask, even though the illumination data may only be from a few points and may represent illumination at a different location than the filtering position (in which case computer manipulation of the data avoids photographic enlargement or reduction of the mask image). Improved illumination uniformity at the original image position provides higher quality images, including integral images, and is particularly beneficial where the original image includes a plurality of independent images (the copies of which are separated).

BRIEF DESCRIPTION OF THE DRAWINGS

To facilitate understanding, identical reference numerals have been used, where possible, to designate identical elements that are common to the figures.

EMBODIMENTS OF THE INVENTION

Figure 1:
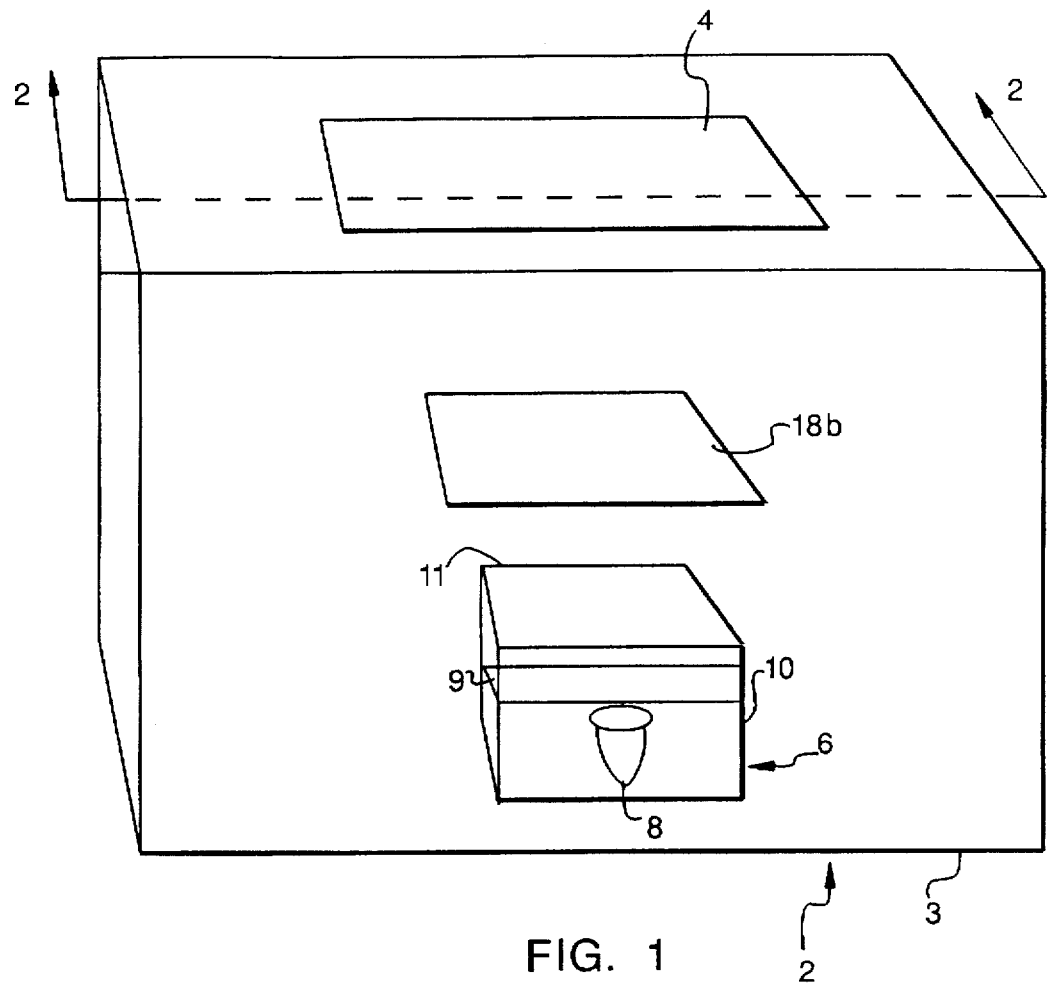
FIG. 1 is a perspective view of a contact printer of the present invention.
Figure 2:
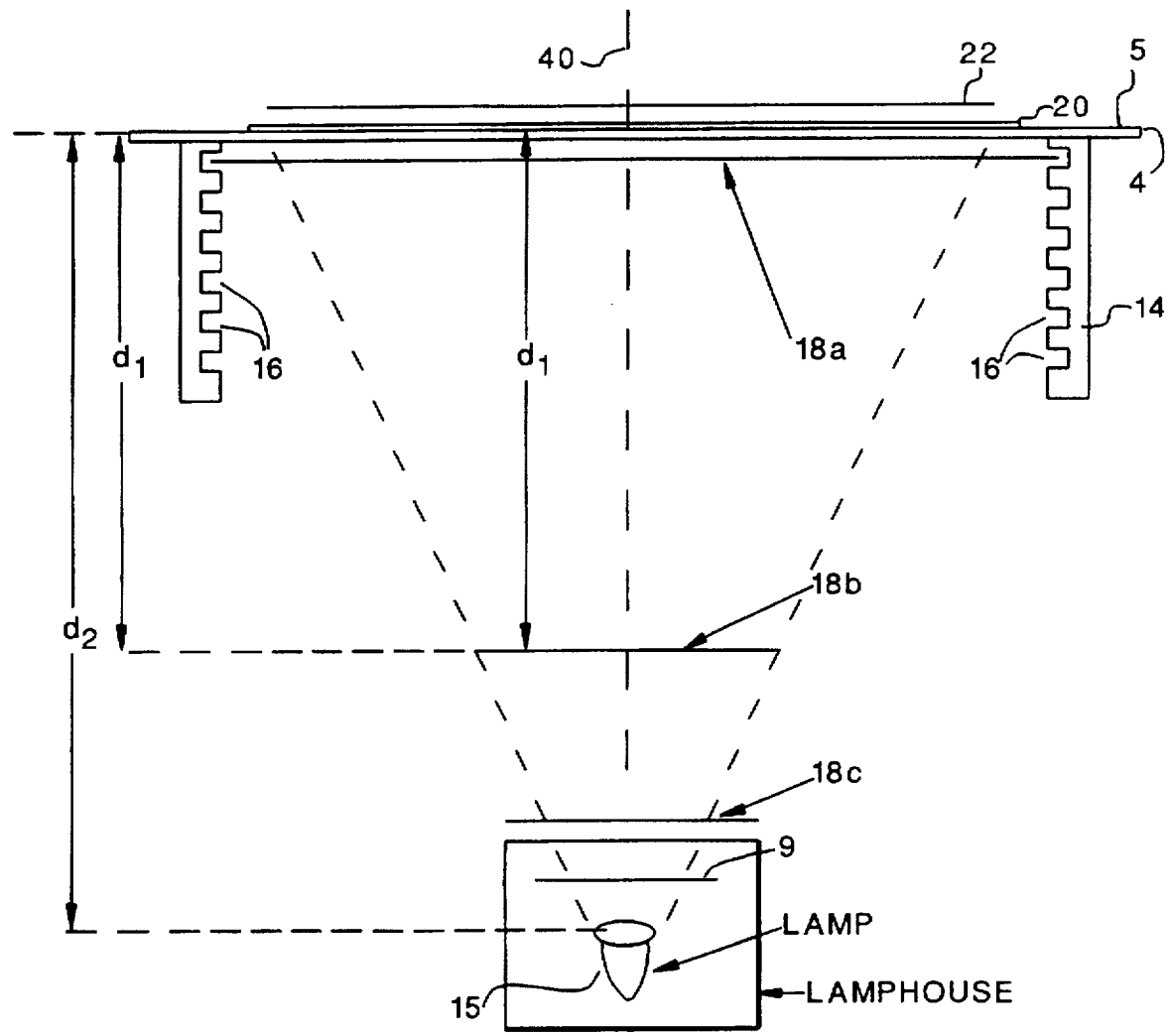
FIG. 2 is a cross-section along the line 2—2 in FIG. 1.

Referring first to FIGS. 1 and 2, the contact printer 2 has a printer housing 3 and a transparent glass platen 4 at an upper end of printer housing 3, an upper surface 5 of which platen 4 serves as an original image position. Beneath and just outside the lateral extent of platen 4, are positioned four elongated brackets 14 (only two of which are seen in FIG. 2) each having a set of slots 16 so as to hold a rectangular mask in any of six possible positions adjacent platen 4 (only the uppermost position being immediately adjacent platen 4). A light source 6 is positioned at a lower position inside printer housing 3. Light source 6 includes an electric lamp and reflector assembly 8, positioned inside a lamphouse 10. Lamphouse 10 is essentially completely closed except for an upper opening 11. One or more color and/or contrast filters, or other filters, may be present immediately above lamp and reflector assembly 8 at position 9. Light source 6 acts as a projection light source in that light from light source 6 diverges at an angle in the direction of platen 4, in a manner most clearly shown by the broken lines in FIG. 2.

Contact printer 2 also includes a mask designated 18b in FIG. 1, which is positioned in the direction of platen 4 from light source 6 (specifically, between light source 6 and platen 4). In FIG. 2 is shown an alternate mask 18a, as well as a second alternate mask 18c. Mask 18c is at a filtering position adjacent light source 6. Masks 18b and 18c are held in their respective filtering positions by a suitable structure (not shown). Mask 18a is in a location which is preferred from the perspective of providing best uniformity of illumination at the original image position. However, film grain of mask 18a may be printed during operation of contact printer 2. On the other hand, mask 18c is at a position which will minimize the chance of film grain appearing in a print produced by contact printer 2. However mask 18c provides less precision in controlling illumination uniformity.

Each mask 18a, 18b or 18c is a generally transparent sheet but carries a mask image which, in the case of a mask prepared by the first aspect of the method of the present invention, is a negative image of light source 6 at the corresponding position for that mask (which position is referenced as a filtering position). Thus, in the contact printer shown with a projection light source 6, the mask image will tend to have a higher density (that is, lower light transmission) toward its center since illumination from light source 6 will tend to be higher at the center than the periphery of each mask 18a, 18b and 18c. As will be described further shortly, in this way any of the masks can reduce any non-uniformity of illumination reaching upper surface 5 of platen 4 from that which would otherwise occur absent the mask. Uniformity of illumination across upper surface, can, for example, be measured as the standard deviation or variance in illumination reaching a statistically significant number of points across upper surface 5. Masks 18a, 18b, and 18c are essentially similar to one another, and being at different locations in the projected light from light source 6 are appropriately sized.

Any of masks 18a, 18b or 18c can be made using the method of the first or second aspects of the present invention.

If the mask is to be made using the first aspect of the method of the present invention (photographic method), a light sensitive photographic element is positioned at an exposure position and exposed to light from light source 6 at that position. The exposure position may broadly be any position from the light source in the direction of upper surface 5 (which again, serves as the original image position), including adjacent (but above) light source 6 or even above upper surface 5. However, the exposure position is preferably between light source 6 to the upper surface 5, and most preferably is the same as the filtering position (that is, the position at which the resulting mask will be used). The photographic element is then processed to form a negative image of the light source at the exposure position. If the exposure position is further from (or closer to) lamp source 6, than is the filtering position for the mask being made, then as part of the processing the mask image should be reduced (or enlarged) in size so that it will extend across the projection of light from light source 6 at the chosen filtering position (as illustrated in FIG. 2). This reduction or enlargement can be conveniently accomplished by a photographic process using an enlarger.

The photographic element used to form the mask can be any light sensitive element (such as a light sensitive element using a silver halide emulsion). By a "negative" image of the light source is meant that areas of higher light intensity will appear darker. The photographic element used will typically be one designed to produce a negative image (designated as a "negative" film, or some other means associated with the film to indicate that it is intended for producing a negative image), and will be processed by a negative process (which for a silver halide element will mean processing with a developer and fixing the resulting negative image). A black and white film will preferably be used in which the image is formed by developed silver, although a film forming a dye image could be used but is less preferable (since some coloring on the processed element may become apparent). It will be appreciated that the exposure duration and processing should be selected for the particular photographic element used to generate the necessary negative image of the light source so as to reduce non-uniformity of illumination from light source 6 which would otherwise reach upper surface 5 (the original image position). Ideally, the gamma of the processed element will be 1 or close to 1 and the lowest density of the mask will be the minimum density of the mask material. Gamma is a well understood term and is described, for example, in T. H. James, editor, *The Theory of the Photographic Process*, 4th Edition, Macmillan, New York, 1977 (particularly p. 502).

Figure 3:
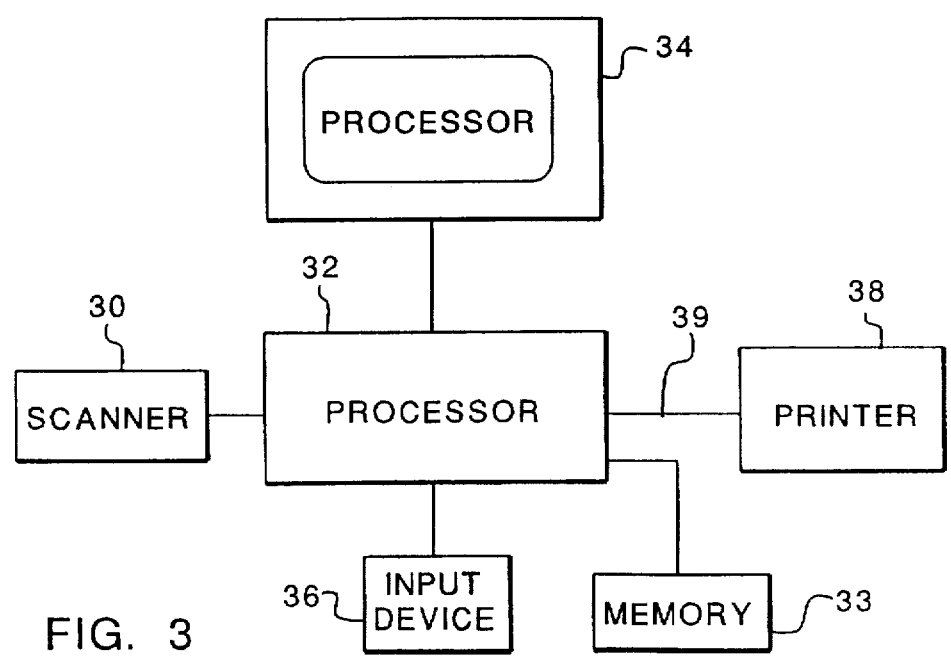
FIG. 3 is a block diagram of an electronic system for generating a mask.

Referring to FIG. 3, this illustrates an apparatus for forming the mask according to a method of the second aspect of the present invention. In particular, FIG. 3 shows a scanner 30 for scanning an exposed and processed photographic element and converting optical density measurements into digital data. Scanner 30 may be any conventional black and white scanner. A color scanner could also be used but is not required. Scanner 30 is connected to a processor 32 which receives instructions for all steps to be executed in processor 32, from any suitable program code held in memory 33. Processor 32 is in turn connected to a monitor 34 and a user input device 36, such as a keyboard and/or pointing device (such as a mouse).

Processor 32, memory 33, monitor 34 and input device 36 may be components of a general purpose digital desktop computer programmed to execute the method described below. The programming may be provided to the memory 33 of the computer on any computer readable storage medium carrying the program. The computer readable storage medium may comprise, for example: magnetic storage media such as magnetic disc (such as a floppy disc or a hard disc drive) or magnetic tape; optical storage media such as optical disc, optical tape, or machine readable bar code; solid state electronic storage devices such as random access memory (RAM), or read only memory (ROM); or any other physical device or medium which might be employed to store a computer program.

A printer 38, preferably a film recorder, is connected to receive mask image data from processor 32 and print the image on a transparency. Printer 38 can be any suitable printer, such as a black and white only printer, although color printers could be used (preferably which have a black dye for example black and white photographic film). Preferably a high resolution film recorder is used as printer 38 to avoid visible edges at which a noticeable drop in density might occur. One such suitable printer is an LVT printer available from Eastman Kodak Company, Rochester, N.Y.

In the method to be executed by the apparatus of FIG. 3, a photographic element is first exposed to light source 6 at some position in a direction of upper surface 5 (the original image position). Typically, the element will be exposed on upper surface 5. The exposed and processed element then, will carry data representative of illumination at multiple laterally spaced locations. These locations are all on the same plane of the element. However, it is not essential for such locations to be coplanar provided that data on their relative distance light source 6 is provided to processor 32, such as through input device 36 and processor 32 is programmed to compensate for the difference in relative distances. For simplicity, the element and processing are selected such that a negative image is formed. However, this is not necessary. It will be appreciated that provided a user indicates through input device 36 whether a negative or positive image is being provided, processor 32 can perform the necessary processing to form the mask image. Nor is it necessary that the processed element exhibit a gamma of 1 since a user can input the gamma value in input device 36 and processor 32 can be programmed to correct density data from scanner 30 based on the input gamma value. One of the advantages in using the method of the second aspect of the present invention, is that regardless of how the illumination data is obtained and input to, processor 32 can be suitably programmed to compensate as necessary to still produce a mask image which, when printed to form a mask and positioned at a filtering position, will reduce illumination non-uniformity at upper surface 5.

Processor 32 can receive the digital data from scanner 30 directly, as shown in FIG. 3, or alternatively the digital data could be first or later stored in a suitable memory (not shown) such as RAM, magnetic or optical memory devices. Processor 32 is suitably programmed to convert the illumination data into the required mask image based on factors already discussed, such as the locations from which the illumination data was obtained, as well as the desired position at which the mask will be used. In this regard it will be seen that another advantage of the method of the second aspect of the present invention is that processor 32 can enlarge or reduce mask image size as required, using well known digital image processing algorithms, depending upon the relative locations at which the illumination data was obtained and the position at which the mask will be used. These relative locations can be specified through input device 36.

The mask image data generated by processor 32 can then be sent to printer 38 (again, preferably a film recorder) for printing on a suitable transparency (in the case of the preferred film recorder, a black and white silver halide film). The resulting mask is then positioned in contact printer 2 at the previously selected position.

The mask image data on line 39 (going to printer 38) to produce the resulting density or transmittance values of the resulting mask is generated by performing the steps steps outlined below. However, not all the steps need necessarily be performed in the order specified.

A test image is made using printer 38 following the same printing process as will be used to make the final mask. This test image comprises a series of test patches generated by specific data values, p, which cover a range of possible values that can be transferred to printer 38 on line 39. It is not necessary to have every possible value represented by a patch.

The test image that is printed using the same printing procedure that will be used for the final mask, is measured. This process involves measuring the transmission, T, of each printed patch on the printed test image. The transmission value, T (defined as the ratio of light intensity coming from the mask at a given location x,y to the light intensity incident on the mask at the same location) is measured for each printed patch. These patch values are correlated with the value p on line 39 used to create the specific patch of measured T.

Using regression or trendline techniques a transfer function, $T_p(p)$, is created. $T_p(p)$ may be in the form of an equation or a look-up table. The transfer function derived from the relationship between the transmittance T at a patch in response to the specific data input values p on line 39 to print that location is defined as $T_p(p)$.

Input data corresponding to the non-uniformity of the intensity of illumination, I, across the platen is measured at discrete points located at positions x,y on upper surface 5 of platen 4. This input data for such positions is defined as I(x,y). Measurement of I(x,y) can be accomplished using any suitable device, such as photo-detectors, scanners, CCD cameras, or by exposing film which is then scanned. For some of these inputs it will be necessary to make a conversion from the measured value to intensity. The minimum of I(x,y) is defined as $I_{min}$ and the maximum is $I_{max}$.

The maximum achievable transmission ratio of the mask 18 is also determined by using a test sample which is close to the minimum density of the mask, $D_{min}$, (such as a patch on the test image which has no printing upon it). The transmission value T for such a test sample is defined as $T_{max}$, and corresponds to the intensity of light passing through the mask at a location where there is no printing, divided by the intensity of the light incident on the mask at a specific point.

The value of the required printer data values as a function of position, p(x,y), is computed by processor 32. Assuming the mask is to be against upper surface 5 of platen 4 the intensity of the signal generated by processor 32 and passed on line 39 to printer 38 is:

$$p(x,y) = T_p^{-1} \left( \frac{K \cdot T_{max} \cdot I_{min}}{I(x,y)} \right) \quad (1)$$

where K is a constant of value 0.9 to 0.95 to provide a margin so that the printer 38 does not saturate, and $T_p^{-1}$ is the inverse of $T_p(p)$. All of the required calculations can be readily executed in processor 32 which has access to the necessary program instructions in memory 33.

Illumination values for every point (x,y) will not likely actually be measured. In order to obtain a mask without edges across which there are significant changes in transmission, for those positions at which illumination data was not measured, processor 32 can have suitable program code which can interpolate between, or extrapolate from, meausured illumination values or calculated printer code values. This interpolation/extrapolation could generate either I(x,y) values or be used to directly calculate p(x,y) values for those locations at which illumination values were not actually measured. Any such suitable program code then, acts as means for interpolating or extrapolating to obtain mask image values at locations other than those for which data representative of illumination was obtained.

The mask image data p(x,y) is next sent on line 39 to the printer 38 to print the correction mask.

If the mask is moved back from the platen 4 by a distance $d_1$ as shown in FIG. 2, and if $d_2$ is the distance of upper surface 5 from the diffused aperture 15 (which is preferably small in diameter), to a first order of approximation equation (1) becomes $$p\left( x \frac{d_2 - d_1}{d_2}, y \frac{d_2 - d_1}{d_2} \right) = T_p^{-1} \left( \frac{K \cdot T_{max} \cdot I_{min}}{I(x,y)} \right) \quad (2)$$

provided the aperture 15 is small, and x=0, y=0 falls at the center point of the mask (which corresponds to a center vertical axis 40 of the printer 2). Note that the mask image then, prior to printing, is formed as the series of printer data values, p(x,y). Those data values are a function of the data representative of illumination, in this case the illumination values I(x,y), and the transfer characteristic, as shown by equation (1) or (2).

Figure 4:
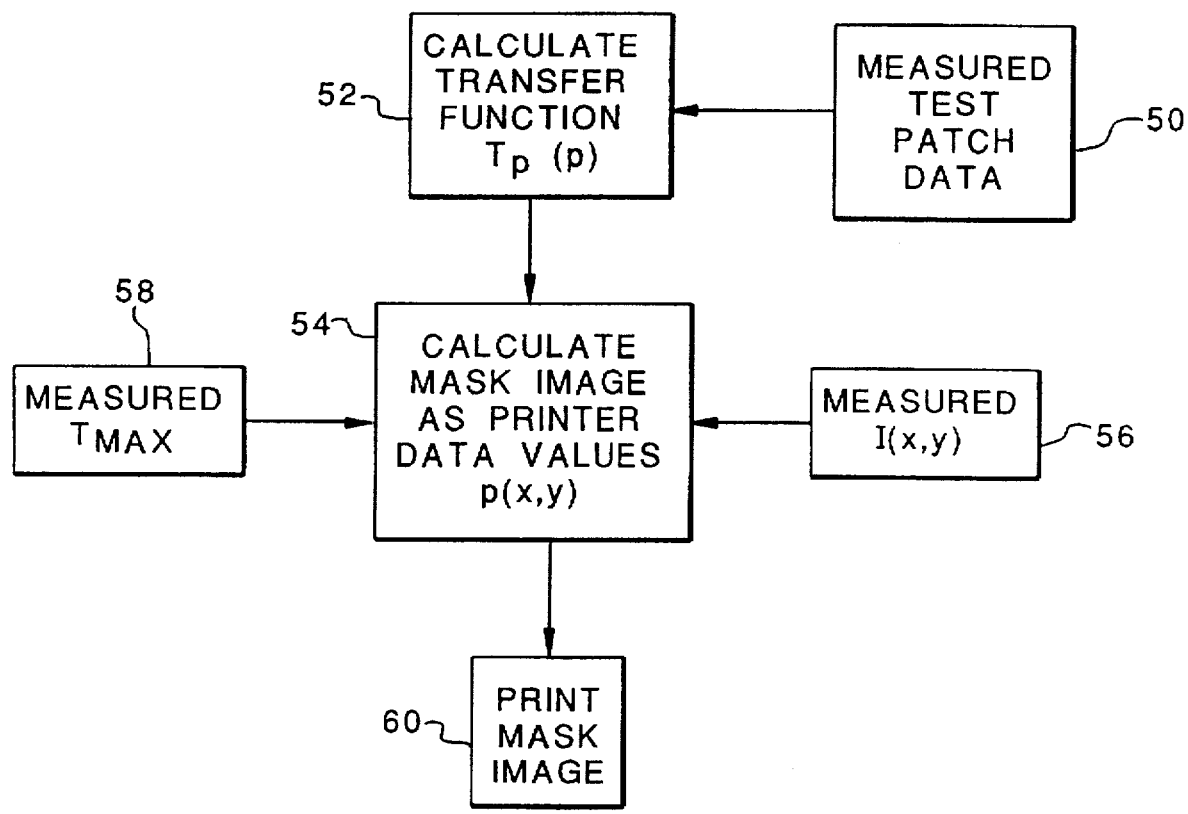
FIG. 4 is a flowchart illustrating a method of the present invention.

The foregoing overall procedure for obtaining the printed mask image is illustrated in the flowchart of FIG. 4. Test patch data including actual printer code values, p, and the corresponding measured transmittance values, T, of the printed test patches are inputted 50. These are used by processor 32 to calculate 52 the transfer function, $T_p(p)$, as described above. Measured Tmax and I(x,y) values are inputted 58, 56 to processor 32 and the required printer data values of the mask image are calculated 54 in accordance with equation (1) or (2) above. The mask image may then be printed 60. If interpolation/extrapolation of printer data values p(x,y) is required for locations at which illumination data was not obtained, these calculations can be done by processor 32 as part of step 54.

Finally, the correction mask is positioned at the filtering position. As a result an original image 20, such as an original integral image, can then be printed by contact printer 2. This is done by positioning original image 20 on the upper surface 5, and positioning a light sensitive element 22 (such as unexposed film) immediately adjacent to and directly above original image 20. Light source 6 is then illuminated to expose element 22 to light which passes through the mask 18a, 18b or 18c and original image 20.

It will be appreciated (and as already mentioned) that in the method of determining the non-uniformity of intensity in the step above, the input illumination data can be obtained from any of a number of possible sources other than a scanner 30. For example, such data could be obtained by actual direct measurement with a sensor such as a photocell which is manually positioned at various defined locations across the illuminated surface 4 and intensity data being recorded of each position as input data which is keyed into processor 32 instead of using a scanner. Alternatively multiple photocells may be used. Another approach is to use a CCD array with an imaging optic or line sensor with suitable optics, or could be obtained by visually estimating illumination variances at the original image position. The data "representative" of illumination, then, may only provide relative illumination values. In cases where the illumination data obtained only represents data for a limited number of lateral locations within the light beam projected by light source 6 (such as might be obtained from photocells reading illumination at points on upper surface 5), processor 32 can be suitably programmed to estimate illumination data at other locations such as by extrapolation or interpolation, or from equations which describe the expected distribution of light.

It will be appreciated that, the present invention can be used for all variety of images including color and black and white as well as 2D, 3D and integral images. The particular application of printing integral images where even illumination and sharpness in the printed image are particularly important to produce a visually acceptable image will benefit considerably from this approach. Once the exposed element 22 has been processed to form a fixed print of the original image 20, it can then be aligned with a suitable integral lens sheet. While the integral lens sheet could be a fly's eye lens sheet it is more preferably a lenticular lens sheet with lenticules on the front surface (in which case the integral image would be a lenticular image). Alternatively, the integral lens sheet could have regions of varying indices of refraction through its volume configured in such a way as to provide (in conjunction with the surfaces of the sheet, such as a curved external surface, flat external surface or some other shape) the same optical deflection of light rays as would be provided by a conventional fly's eye or lenticular lens sheet. Also, the back surface of the lens sheet may also be curved so as to either strengthen the lens effect or compensate for the curved focal plain which may be inherent in the lens construction. Consequently, the curvature on the back side may be the of such a shape as to match the curvature of the focal plain of the lens.

Further, as described above, by an "integral" image is referenced an image composed of segments (lines, in the case of a lenticular lens sheet) from at least one complete image (and often more than one image), which segments are to be aligned with respective individual lenses of an integral lens sheet so that each of the one or more images is viewable when a user's eyes are at the correct angle relative to the imaging element. The integral image can be one or more three-dimensional images, one or more two dimensional images, or any combination of the foregoing. By a "three-dimensional image", is meant an integral image which, when viewed through the lens, has a visible depth element. A depth element means the ability to at least partially look around an object in the scene. This can be obtained by interlacing lines from different perspective views of the same scene (that is, views from different angular positions with respect to the scene). Thus, a three-dimensional image necessarily includes at least two views of a scene. By a two-dimensional image is referenced an image which, when viewed in the final product, does not have any viewable depth element.

The invention has been described with reference to a preferred embodiment. However, it will be appreciated that variations and modifications can be effected by a person of ordinary skill in the art without departing from the scope of the invention.

| PARTS LIST | |
|---|---|
| 2 | Contact Printer |
| 3 | Printer Housing |
| 4 | Platen |
| 5 | Upper Surface |
| 6 | Source |
| 8 | Assembly |
| 9 | Position |
| 10 | Lamphouse |
| 11 | Upper Opening |
| 14 | Brackets |
| 15 | Aperture |
| 16 | Slots |
| 18a, 18b, 18c | Masks |
| 20 | Original Image |
| 22 | Element |
| 30 | Scanner |
| 32 | Processor |
| 34 | Monitor |
| 34 | Processor |
| 36 | Input Device |
| 38 | Printer |
| 39 | Line |
| 40 | Axis |
| 50–60 | Steps |

We claim:

1. A method of improving uneven illumination in a contact printer having an original image position and a light source to illuminate the original image position, which light source may illuminate the original image position non-uniformly, the method comprising:

first forming a mask by exposing a photographic element to the light source and processing the element to form a negative image of the light source at a filtering position between the light source and the original image position; and positioning the mask at the filtering position.

2. A method according to claim 1 wherein the photographic element is a silver halide element which is processed by a negative process.

3. A method of improving uneven illumination in a contact printer having an original image position and a light source to illuminate the original image position, which light source may illuminate the original image position non-uniformly, the method comprising:

first forming a mask which will be positioned at a filtering position between the light source and the original image position, by exposing to the light source a photographic element at an exposure position from the light source in the direction of the original image position, and processing the element to form a negative image, where the exposure and filtering positions may be the same or different; and positioning the mask at the filtering position;

wherein when the exposure and filtering positions are different, the processing includes reducing or enlarging the negative image.

4. A method according to claim 3 additionally comprising exposing a light sensitive element positioned adjacent the original image position to light passing through the mask and the original image from the light source, to form a print of the original image on the light sensitive element.

5. A method according to claim 4 wherein the original image is an integral image.

6. A method according to claim 4 wherein the original image includes a plurality of independent images, the method additionally comprising, after exposure of the light sensitive element, separating the copies of the plurality of independent images formed on the light sensitive element.

7. A method according to claim 3 wherein the exposure and filtering positions are the same.

8. A method according to claim 3 wherein the exposure and filtering positions are different.

9. A method according to claim 3 wherein the exposure and filtering positions are at or adjacent the original image position.

10. A method according to claim 1 wherein the density distribution of the mask is such that the light reaching the original image position from the light source and through the mask positioned at the second position, is substantially uniform in intensity.

11. A method according to claim 5 wherein the light source is a projection light source.

12. A contact printer comprising:

an original image holder to hold an original image to be printed at an original image position;

a light source to illuminate the original image position; and a mask positioned at a filtering position between the light source and the original image position, which mask is a photographic element which was exposed to the light source and processed to form a negative image of the light source at the filtering position.

13. A contact printer according to claim 12 wherein the mask was exposed at an exposure position which is substantially the same as the filtering position.

14. A contact printer according to claim 12 wherein the mask is positioned at a filtering position which is adjacent the original image position.

15. A contact printer according to claim 12 wherein the mask was exposed at an exposure position, wherein the exposure and filtering position are both at or adjacent the original image position.

16. A contact printer according to claim 12 wherein the mask is positioned adjacent the light source.

17. A contact printer according to claim 12 wherein the mask is positioned between the light source and the original image position.

18. A contact printer according to claim 12 wherein the light source is a projection light source.

19. A method of improving uneven illumination in a contact printer having an original image position and a light source to illuminate the original image position, which light source may illuminate the original image position non-uniformly, the method comprising:

inputting into a computer, data representative of illumination at multiple laterally spaced locations positioned in a direction from the light source to the original image position;

processing the data in the computer to form a mask image which when printed on a support and positioned at a filtering position between the light source and the original image position, improves illumination uniformity at the original image position;

printing the mask image on a support; and positioning the mask at the filtering position.

20. A method according to claim 19 additionally comprising printing a series of test patches of different optical density corresponding to data values sent to the printer, measuring the optical density of the printed test patches and determining as a density transfer characteristic the relationship between data values sent to the printer and the corresponding printed optical density.

21. A method according to claim 20 wherein the mask image, prior to printing, is formed as a series of printer data values which are a function of the data representative of illumination and the transfer characteristic.

22. The method of claim 19 wherein the data representative of illumination is obtained from a sensor which measures illumination at multiple locations on the original image position.

23. The method of claim 19 wherein the step of inputting into the computer, data representative of illumination, comprises exposing to the light source a photographic element at an exposure position from the light source in the direction of the original image position, and processing the element to form an image of the light source, where the exposure and filtering positions may be the same or different; and scanning the exposed and processed original image to obtain the data representative of illumination.

24. A method according to claim 23 wherein at least some of the data represent illumination at a distance from the light source which is different from the distance of the filtering position from the light source, and wherein the step of processing the data to form the mask adjusts the density of the mask as a function of the differences in the distances.

25. A method according to claim 19 additionally comprising exposing a light sensitive element positioned adjacent the original image position to light passing through the mask and the original image from the light source, to form a print of the original image on the light sensitive element.

26. A method according to claim 25 wherein the original image is an integral image.

27. A method according to claim 26 wherein the integral image is a lenticular image.

28. A method according to claim 27 additionally comprising aligning the lenticular image print with a lenticular lens sheet.

29. A contact printer comprising:

an original image holder to hold an original image to be printed at an original image position;

a light source to illuminate the original image position; and a mask positioned at a filtering position between the light source and the original image position, which mask carries a computer printed image obtained from computer processing of data representative of illumination at multiple laterally spaced apart locations positioned in a direction from the light source to the original image position, such that the mask improves illumination uniformity at the original image position.

30. A computer program product, comprising: a computer readable storage medium including program means which comprises:

means for receiving data representative of illumination at multiple laterally spaced locations positioned in a direction, in a contact printer, from a light source of the printer to an original image position of the printer;

means for processing the data in the computer to form a mask image which when printed on a support and positioned at a filtering position between the light source and the original image position, improves illumination uniformity at the original image position;

means for processing the data in a computer to form a mask image which when printed on a support and positioned at a filtering position between the light source and the original image position, improves illumination uniformity at the original image position;

means for causing a printer connected to the computer to print the mask image on the support.

31. A computer program product according to claim 30 wherein the means for processing includes means for interpolating or extrapolating to obtain mask image values at locations other than those for which data representative of illumination was obtained.

* * * * *